United States Patent
Bayer et al.

(10) Patent No.: US 8,395,297 B2
(45) Date of Patent: Mar. 12, 2013

(54) ELECTRIC MACHINE HAVING AT LEAST TWO PAIRS OF CARBON BRUSHES

(75) Inventors: Michael Bayer, Ludwigsburg (DE); Walter Gerschwitz, Moensheim (DE); Gerlinde Gerschwitz, legal representative, Moensheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/736,754

(22) PCT Filed: May 7, 2009

(86) PCT No.: PCT/EP2009/055517
§ 371 (c)(1),
(2), (4) Date: Feb. 23, 2011

(87) PCT Pub. No.: WO2009/135894
PCT Pub. Date: Nov. 12, 2009

(65) Prior Publication Data
US 2011/0187225 A1    Aug. 4, 2011

(30) Foreign Application Priority Data
May 9, 2008   (DE) .......................... 10 2008 001 699

(51) Int. Cl.
*H01R 39/40*   (2006.01)
(52) U.S. Cl. ........ 310/241; 310/244; 310/248; 310/239; 310/245
(58) Field of Classification Search .................. 310/238, 310/239, 241, 242, 244, 246, 248
See application file for complete search history.

(56) References Cited

U.S. PATENT DOCUMENTS

| | | | | |
|---|---|---|---|---|
| 1,248,574 A | * | 12/1917 | Tingley | 310/244 |
| 1,509,666 A | * | 9/1924 | Campbell | 310/245 |
| 3,590,299 A | * | 6/1971 | Wiggs et al. | 310/246 |
| 5,594,290 A | * | 1/1997 | Shannon et al. | 310/251 |
| 5,717,271 A | * | 2/1998 | Aoki et al. | 310/242 |
| 5,852,352 A | * | 12/1998 | Suriano | 318/541 |
| 6,559,571 B1 | * | 5/2003 | Klode | 310/241 |
| 7,071,643 B2 | * | 7/2006 | Prevo et al. | 318/268 |
| 7,256,527 B2 | * | 8/2007 | Niimi | 310/239 |
| 2004/0104639 A1 | | 6/2004 | Wong | |
| 2004/0145268 A1 | | 7/2004 | Yamamoto et al. | |
| 2007/0007846 A1 | | 1/2007 | Niimi | |

FOREIGN PATENT DOCUMENTS

| | | |
|---|---|---|
| JP | 5765250 | 4/1982 |
| JP | 5879459 | 5/1983 |
| JP | 6162565 | 4/1986 |
| JP | 2004509585 | 3/2004 |
| JP | 2004364414 | 12/2004 |
| WO | WO 02/23682 | 3/2002 |

* cited by examiner

*Primary Examiner* — Hanh Nguyen
*Assistant Examiner* — Naishadh Desai
(74) *Attorney, Agent, or Firm* — Kenyon & Kenyon LLP

(57) ABSTRACT

An electric machine has at least two pairs of carbon brushes made up of one plus and one minus carbon brush, which interact with a commutator in order to supply current to the rotor, the carbon brushes being mounted with their brush holder on a brush plate via a mount, and the mounts on the brush plate lying across from each other at 180°. The holding part on at least one brush holder is offset from the center, in particular from the axis of symmetry of the brush holder, by an angle relative to the rotor axis so as to realize an asymmetrical placement of the carbon brush, the holding part on the other brush holders being disposed on their axes of symmetry.

10 Claims, 3 Drawing Sheets

ELECTRIC MACHINE HAVING AT LEAST TWO PAIRS OF CARBON BRUSHES

BACKGROUND OF THE INVENTION

1. Field of the Invention

The present invention relates to an electric machine having at least two pairs of carbon brushes, which are made up of one plus- and one minus-carbon brush, for the supply of current to the rotor of the machine.

2. Description of Related Art

In the known so-called commutator machines the windings of the rotor are supplied with current via a commutator with the aid of carbon brushes disposed in a stationary manner. Depending on the use of the electric machine, the carbon brushes are subject to varying degrees of wear on their running surface on the commutator during operation. Direct-current motors, which are used for starting internal combustion engines, are exposed to particularly high loads. In most cases the carbon brushes consist of a sintered material predominantly having copper and graphite components. The starter motors are typically designed for short-term operation with a service life of approximately 30,000 to 60,000 switching cycles.

When using starter motors in motor vehicles having an automatic start-stop control, however, considerably more switching cycles are required on account of the frequent start-stop operations. In this context it is important that all carbon brushes of the machine are subjected to loading that is of equal magnitude and uniform nature, if possible. In the currently used starter motors, the carbon brushes are disposed along the periphery of the commutator at an equidistant angular distance, which amounts to 60° in the case of a six-pole machine. In order to reduce the speed ripple, a lamellae number that is not evenly divisible by the pole number is selected for the commutator of the starter motor. For a six-pole machine, for example, commutators having 23 or 28 lamellae are used. This produces different loading of the plus and minus brushes because the brush pairs assume different positions as a function of the direction of rotation when running onto and off the lamellae. This difference results in a different loading profile for the pairs of brushes or for individual carbon brushes, in that certain carbon brushes are acted upon by different current loads compared to the other carbon brush of the brush pair when running up a lamella or down a lamella, depending on the direction of rotation. In addition, considerably higher load peaks are created at the individual carbon brushes. As a result, the carbon brushes age or wear to different degrees, so that the achievable service life of the machine is reduced in a disadvantageous manner due to the greater wear of individual carbon brushes. The carbon brushes of the individual pairs are offset by 180° in each case.

To increase the service life of the electric machine, the lowest and most uniform wear possible is endeavored on all carbon brushes by an optimal distribution of the current load and the load peaks at the carbon brushes. In this context it has already been proposed to set the plus and minus brush across from each other at an angle that deviates from 180° for at least one pair of brushes of the machine. Such an asymmetrical placement of the carbon brushes makes it possible to achieve an optimal distribution of the electric load and the load peaks at the carbon brushes by the lamellae span of the carbon brushes, which generally amounts to one to one and a half lamella(e). Since, depending on the running direction of the commutator, the offset of individual carbon brushes from the symmetrical position differs for an optimal commutation, a counterclockwise rotation requires a different placement than a clockwise rotation.

In addition, placements of individual carbon brushes featuring varying degrees of asymmetry result as a function of the number of lamellae. Since the carbon brushes are accommodated in brush holders, which are inserted on a fixedly mounted brush plate via a holding element in the known manner, it is disadvantageous if a multitude of different brush plates and brush holders is required in order to achieve the necessary asymmetrical placement of individual carbon brushes.

An object of the present invention is to keep the number of parts for obtaining an asymmetrical placement of individual carbon brushes to a minimum.

BRIEF SUMMARY OF THE INVENTION

An electric machine according to the present invention has the advantage that the use of a uniform brush plate makes it possible to realize an asymmetrical placement of individual carbon brushes for both directions of rotation as a function of the direction of rotation; furthermore, no modification of brush plates for symmetrical and asymmetrical placements of carbon brushes for an anti-clockwise rotation or a clockwise rotation is required either. This approach has the additional advantage that only the carbon brush for which an asymmetrical placement is provided requires a correspondingly adapted holding part on the brush holder, which is able to be inserted in the symmetrically disposed mount of the brush plate. Depending on the direction of rotation of the rotor, the holding part is offset to the right or left from the center of the brush holder by an angle $\alpha$. Using brush holders made from plastic, the basic tools for the production of the brush holder may be retained. Only the counterpart of the tool specifying the position of the holding part on the rear side of the brush holder must then be adapted for the different holders that are dependent on the direction of rotation.

For a commutator machine having two pairs of brushes, the holding part on only one brush holder is disposed at a lateral offset from the center in the simplest manner. As an alternative, however, it is also possible to offset the holding part of the brush holder on each plus or minus carbon brush of the brush pairs. Furthermore, it is useful to offset the holding part from the center of the brush holder by an angle $\alpha$, the size of angle $\alpha$ being a function of the number of lamellae of the commutator. In the simplest case, the holding part on the brush plate is formed as a groove, and the matching holding part on the brush holder as a rib, groove and rib of the mount being in radial alignment with the rotor axle. An especially advantageous and simple mount of the brush holders on the brush plate is realized in that the groove is open toward the inner circumference of the brush plate, and in that the rib is disposed on the rear side of the plastic brush holder and engages with a shoe-shaped flat projection behind the brush plate. Applying the present invention to a six-pole starter motor for internal combustion engines, angle $\alpha$ relative to the rotor axis, by which the holding part of the brush holder is offset from its axis of symmetry, amounts to 2°, counter to the direction of rotation of the rotor.

In the ideal case, given a six-pole commutator machine having four carbon brushes, only one of the two minus carbon brushes is fitted with a brush holder which has an offset holding part. In a six-pole commutator machine having six carbon brushes, all three minus carbon brushes are ideally fitted with brush holders, each of which features an offset holding part.

DETAILED DESCRIPTION OF THE INVENTION

Figure 1:
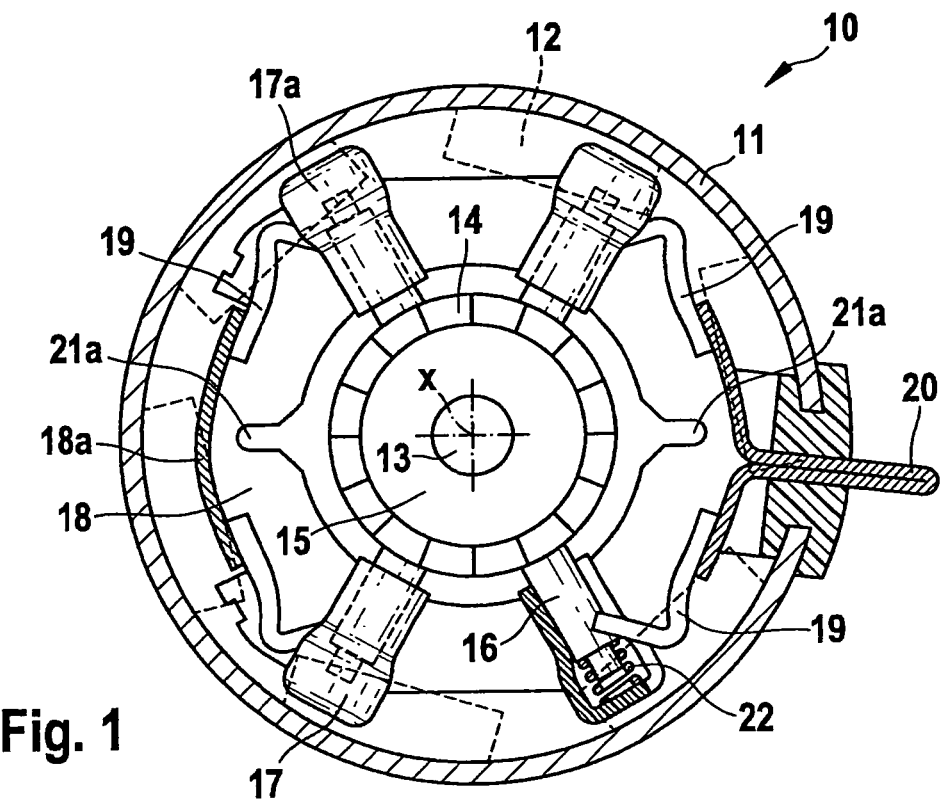
FIG. 1 shows the cross-section through a six-pole starter motor having two pairs of brushes.

In FIG. 1, an electric commutator machine is shown in cross-section in the commutator region, the commutator machine being used as starter motor for internal combustion engines in motor vehicles having an automatic start-stop control. The starter motor denoted by 10 has a stationary pole casing 11, in whose front portion six magnetic poles 12, denoted by dashed lines, are disposed along the inner circumference; the magnetic poles interact with a rotor (not visible) which is mounted on a rotor shaft 13. The rotor windings are electrically supplied via lamellae 14 of a commutator 15 mounted on the rear shaft end, which interact with four carbon brushes 16, which are mounted on a brush plate 18 via brush holders 17 in axially displaceable manner. Metal brush plate 18 is fixed in place on the rear end of the machine and connected to ground via pole casing 11. Carbon brushes 16 form two pairs of brushes made up of one plus and one minus carbon brush in each case. Via a brush lead 19, the two plus carbon brushes are contacted by a plug and socket connection 20, which is routed to the outside through pole casing 11. In contrast, brush leads 19 of the two minus carbon brushes are welded to a tab 18a of brush plate 18 and connected to ground in this manner. Carbon brushes 16 are accommodated via their brush springs 22 in their brush holder 17, 17a in a manner allowing axial displacement.

Figure 2:
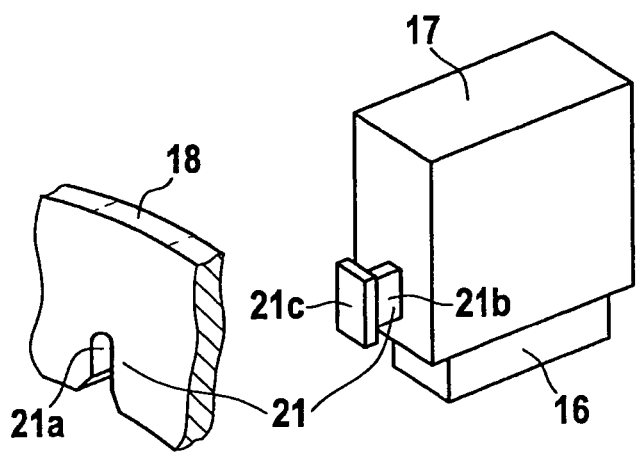
FIG. 2 shows a brush holder having a holding part and a cut-out in a brush plate having a mount for inserting the brush holder.

FIG. 2 illustrates that brush holders 17 are mounted on brush plate 18 via a mount 21. It can be gathered from a space diagram that holding part 21a on brush plate 18 is developed in the form of a groove, which is open toward the inner circumference of brush plate 18. As counter part, holding part 21b, which is to be slipped into groove 21a of the brush plate, is developed in the form of a rib on the rear side of brush holder 17 made of plastic. A flat, shoe-shaped projection 21c engages behind brush plate 18 in each case. Groove 21a and rib 21b of mount 21 are radially aligned with rotor axis x. Grooves 21a are distributed symmetrically on brush plate 18 at 60° offsets and are situated in paired manner diametrically across from each other at an 180° offset.

Figure 3:
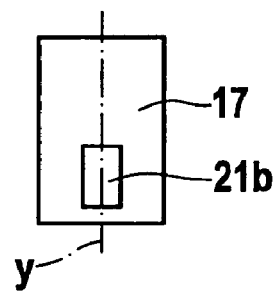
FIG. 3 shows the rear side of the brush holder featuring a symmetrical placement of the holding part
Figure 4:
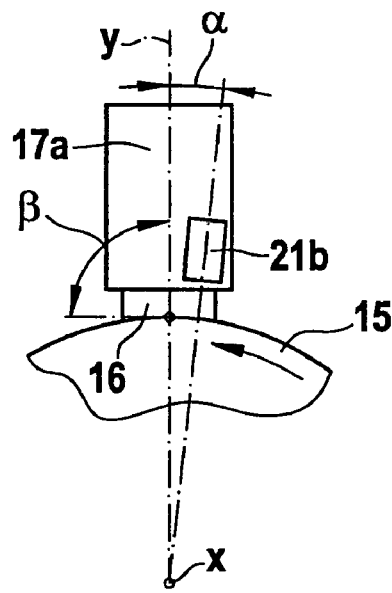
FIG. 4 shows a brush holder having an asymmetrically disposed holding part.

While the rear sides of three brush holders 17 are provided with a holding part 21b, which according to FIG. 3 is disposed in perpendicular fashion in the center of brush holder 17 on its axis of symmetry y, in order to achieve an asymmetrical placement of the fourth carbon brush, mount 21b of brush holder 17a according to FIG. 4 is offset from the center of axis of symmetry y of brush holder 17a by an angle α relative to rotor axis x. Carbon brush 16 with brush holder 17a is aligned at an angle β of 90° perpendicular to the surface of commutator 15. Depending on the direction of rotation of the machine, holding part 21b on brush holder 17a is to be placed at an offset to the left or to the right. According to FIG. 4, holding part 21b is offset to the right by angle α, counter to the direction of rotation of commutator 15.

Figure 5:
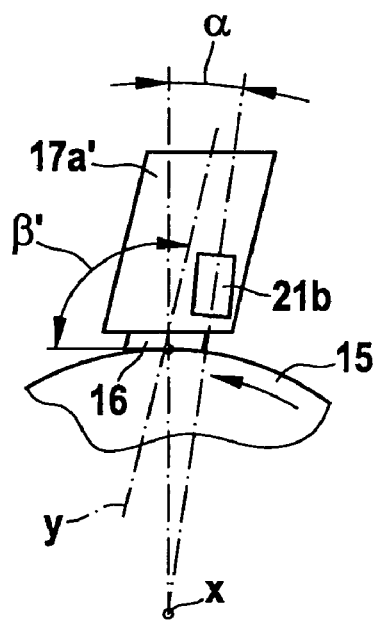
FIG. 5 shows another exemplary embodiment of an obliquely positioned brush holder with an asymmetrical placement of the holding part.

FIG. 5 shows a schematized illustration of a brush system that is placed obliquely to the commutator rotation. There, axis of symmetry y of brush holder 17a' forms an angle β' of more than 90° relative to the lamella surface of commutator 15. Here, too, holding part 21b of the one brush holder 17a', which is to have an asymmetrical placement, is offset from the center of brush holder 17a by angle α relative to rotor axis x, counter to the direction of rotation of the machine, and radially aligned with rotor axis x.

Figure 6:
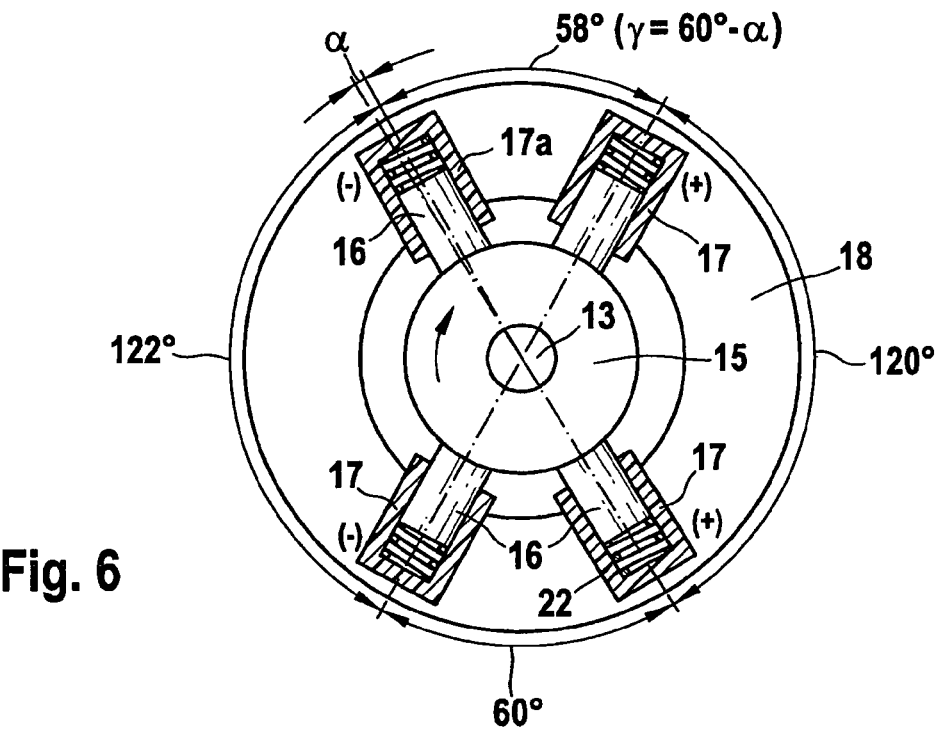
FIG. 6 shows a schematized illustration of a commutator having a brush plate and four carbon brushes, one of which is disposed asymmetrically.

FIG. 6 shows a schematized illustration of the placement of four carbon brushes 16 on their brush plate 18 for a six-pole commutator machine. Only one of the two minus carbon brushes has a brush holder 17a having a holding part 21b that is offset from the center of brush holder 17a at an angle α. Depending on the number of lamellae of commutator 15, the particular holding part must be placed at an offset from the center of brush holder 17a at an angle α that may be smaller or greater. In the exemplary embodiment at hand, for commutator 15, which has 28 lamellae, angle α=2°. Thus, the angle with respect to the following plus carbon brush γ=60°−α=58°. The angle relative to previous minus carbon brush 16 therefore amounts to 122°. For a commutator having 23 lamellae, for example, angle α for a six-pole commutator machine lies in a range of 2° to 3°.

Figure 7:
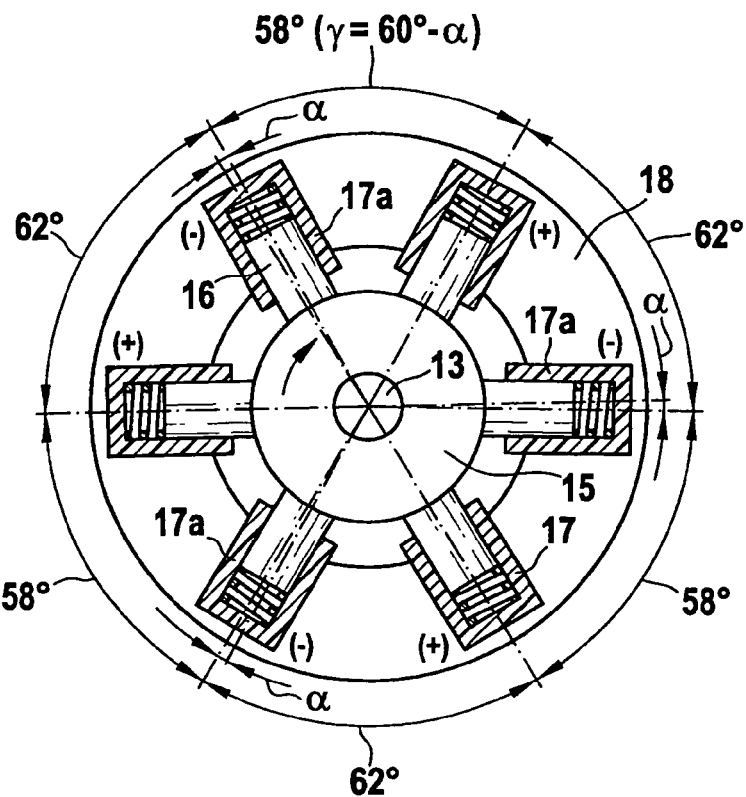
FIG. 7 shows as additional exemplary embodiment in a schematized illustration, a commutator and a brush plate having six carbon brushes, the three minus carbon brushes being asymmetrically disposed.

FIG. 7 shows another exemplary embodiment, depicted in schematized form, of a six-pole commutator machine having six carbon brushes 16, where all three minus carbon brushes have a brush holder 17a whose holding part 21b is offset by an angle α. This results in an angle γ=60°−α for all three minus carbon brushes 16 with respect to the carbon brush 16 that comes next in the direction of rotation of commutator 15 in each case. Thus, at an angle α=2°, angle γ=58°. Consequently, the angle with respect to the previous plus carbon brush 16 amounts to 62° in each case.

The present invention is not limited to the exemplary embodiments shown. As an alternative to the exemplary embodiment according to FIG. 6, it is also possible to place both minus carbon brushes in one brush holder 17 having an offset holding part. In the same way, the exemplary embodiment according to FIG. 7 makes it possible to place only one or two of the three minus carbon brushes 16 in one brush holder 17a having an offset holding part 21b. It is likewise possible to realize the principle for achieving the object the present invention in four-pole, eight-pole or twelve-pole commutator machines, provided the number of lamellae is not evenly divisible by the number of poles. In addition, the mounts between brush holders and brush plate may be constructed differently within the framework of the present invention. In order to avoid an unnecessarily large number of parts, it is essential, however, that brush plate 18 features a uniform, symmetrical placement of holding parts 21a for carbon brushes 16, regardless of the direction of rotation of the machine and regardless of the number of lamellae of commutator 15, and that in this case only individual brush holders are modified in that holding part 21b is offset from the center to the right or left at an angle α that may be greater or smaller as a function of the direction of rotation of the machine. In the simplest case, the affixation of the brush holders may be realized via the loose mount or the seat of the brush holders in the stationary brush plate, by fixing them in place via the brush spring, the carbon brush and the commutator. Other connections of brush holders on the brush plate are conceivable as well, however, such as riveted connections, for example. In such cases, too, the achievement of an asymmetrical brush placement requires the rivet mount on the brush holder to be offset from the center of the brush holder by angle α.

What is claimed is:

1. An electric machine, comprising:
    a rotor;
    a commutator; and
    at least two pairs of carbon brushes, each pair including one plus carbon brush and one minus carbon brush; and
    at least two pairs of brush holders for holding the at least two pairs of carbon brushes, wherein for each carbon brush and a corresponding brush holder holding the carbon brush, an axis of symmetry of the carbon brush extending through the carbon brush is substantially parallel to an axis of symmetry of the corresponding brush holder extending through the brush holder;
    wherein the carbon brushes interact with the commutator to supply current to the rotor;
    wherein the plus and minus carbon brushes of each pair lie opposite one another at the commutator;
    wherein the plus and minus carbon brushes of each pair are coupled to corresponding brush holders and mounted on a brush plate using respective mounts, wherein each mount includes a holding part on the brush plate and a holding part on the brush holder, the mounts for the plus and minus carbon brushes of each pair lying across from each other at 180 degrees;
    wherein, in order to achieve an asymmetrical placement of the carbon brush, the holding part on at least one brush holder is offset from the axis of symmetry of the at least one brush holder by an angle relative to a rotational axis of the rotor, and wherein the holding part on other brush holders is disposed on the axis of symmetry of the respective brush holder.

2. The electric machine as recited in claim 1, wherein, for each brush pair, the holding part on the brush holder for one of the plus or minus carbon brush is offset from the axis of symmetry of the brush holder for one of the plus or minus carbon brush.

3. The electric machine as recited in claim 2, wherein the holding part on the brush holder for one of the plus or minus carbon brush is offset to the left or right of the axis of symmetry of the brush holder for one of the plus or minus carbon brush as a function of the direction of rotation of the electric machine.

4. The electric machine as recited in claim 3, wherein the holding part on the brush holder is offset from the center of the brush holder at an angle selected as a function of the number of lamellae of the commutator not evenly divisible by the number of poles of the electric machine.

5. The electric machine as recited in claim 2, wherein the holding part on the brush plate is implemented in the form of a groove, and the holding part on the brush holder is implemented in the form of a rib.

6. The electric machine as recited in claim 5, wherein the groove and the rib are radially aligned with the rotational axis of the rotor.

7. The electric machine as recited in claim 6, wherein the groove is open toward the inner circumference of the brush plate, and the rib is disposed on the rear side of the brush holder and connected to a flat, shoe-shaped projection.

8. The electric machine as recited in claim 2, wherein the electric machine is a six-pole commutator machine having four carbon brushes, and wherein only one of the two minus carbon brushes has a brush holder with an offset holding part.

9. The electric machine as recited in claim 2, wherein the electric machine is a six-pole commutator machine having six carbon brushes, and wherein all three minus carbon brushes have a brush holder with an offset holding part.

10. The electric machine as recited in claim 4, wherein the electric machine is a six-pole starter motor for an internal combustion engine and has a number of lamellae not evenly divisible by the number of poles of the electric machine, and wherein the offset angle is approximately 2° to 3° counter to the direction of rotation of the rotor.

* * * * *